United States Patent
Wentink et al.

(10) Patent No.: US 9,148,871 B2
(45) Date of Patent: Sep. 29, 2015

(54) SYSTEMS AND METHODS FOR ACKNOWLEDGING COMMUNICATIONS FROM A PLURALITY OF DEVICES

(75) Inventors: Maarten Menzo Wentink, Breukelen (NL); Vincent Knowles Jones, IV, Redwood City, CA (US)

(73) Assignee: Qualcomm Incorporated, San Diego, CA (US)

( * ) Notice: Subject to any disclaimer, the term of this patent is extended or adjusted under 35 U.S.C. 154(b) by 165 days.

(21) Appl. No.: 13/489,000

(22) Filed: Jun. 5, 2012

(65) Prior Publication Data
US 2013/0148575 A1    Jun. 13, 2013

Related U.S. Application Data

(60) Provisional application No. 61/495,256, filed on Jun. 9, 2011.

(51) Int. Cl.
| | | |
|---|---|---|
| H04L 12/28 | (2006.01) | |
| H04W 68/00 | (2009.01) | |
| H04L 1/16 | (2006.01) | |
| H04W 84/18 | (2009.01) | |

(Continued)

(52) U.S. Cl.
CPC .............. *H04W 68/00* (2013.01); *H04L 1/1607* (2013.01); *H04L 2001/0093* (2013.01); *H04W 4/06* (2013.01); *H04W 84/18* (2013.01)

(58) Field of Classification Search
CPC ... H04W 68/00; H04L 12/18; H04L 12/1868; H04L 1/1621; H04L 1/1628
USPC ......... 370/328–329, 335–336, 338, 342–343, 370/345–346, 389, 392, 400–401, 432, 437, 370/441–442, 498
See application file for complete search history.

(56) References Cited

U.S. PATENT DOCUMENTS

| | | | | |
|---|---|---|---|---|
| 6,839,336 | B2 * | 1/2005 | Tiedemann et al. | 370/335 |
| 7,562,363 | B1 * | 7/2009 | Belair et al. | 718/102 |

(Continued)

FOREIGN PATENT DOCUMENTS

| | | |
|---|---|---|
| JP | 2012510734 A | 5/2012 |
| JP | 2012517719 A | 8/2012 |

(Continued)

OTHER PUBLICATIONS

International Search Report and Written Opinion—PCT/US2012/041171—ISA/EPO—Sep. 20, 2012.

(Continued)

*Primary Examiner* — Kevin Mew
(74) *Attorney, Agent, or Firm* — Kevin T. Cheatham

(57) ABSTRACT

Systems, methods, and devices for acknowledging communications from a plurality of devices for acknowledging communications from a plurality of devices are described herein. In some aspects, a group ACK includes a bitmap indicating whether a communication has been received from each of a plurality of apparatuses within a previous period. The previous period may comprise a time period since a previous ACK. In some aspects, group ACKs are transmitted pursuant to a schedule. For example, group ACKs may be transmitted a scheduled time after transmitting a beacon. In some aspects, a bitmap indicating whether a communication has been received from each of a plurality of apparatuses within a previous period may be transmitted in a beacon.

42 Claims, 9 Drawing Sheets

(51) Int. Cl.
*H04L 1/00* (2006.01)
*H04W 4/06* (2009.01)

(56) References Cited

U.S. PATENT DOCUMENTS

| | | | |
|---|---|---|---|
| 7,830,916 B2* | 11/2010 | Qi et al. | 370/468 |
| 7,936,709 B2* | 5/2011 | Bhatti et al. | 370/326 |
| 8,023,453 B2* | 9/2011 | Sammour et al. | 370/328 |
| 8,116,333 B2* | 2/2012 | Cho et al. | 370/413 |
| 8,306,060 B2* | 11/2012 | Ngo et al. | 370/473 |
| 8,310,921 B2* | 11/2012 | Cho et al. | 370/229 |
| 2003/0169769 A1* | 9/2003 | Ho et al. | 370/473 |
| 2003/0202491 A1* | 10/2003 | Tiedemann et al. | 370/335 |
| 2003/0214928 A1* | 11/2003 | Chuah | 370/336 |
| 2006/0007887 A1* | 1/2006 | Kwon et al. | 370/329 |
| 2006/0087998 A1* | 4/2006 | Saito et al. | 370/328 |
| 2006/0107166 A1* | 5/2006 | Nanda | 714/748 |
| 2008/0186886 A1* | 8/2008 | Cho et al. | 370/310 |
| 2008/0267168 A1* | 10/2008 | Cai et al. | 370/352 |
| 2009/0022098 A1* | 1/2009 | Novak et al. | 370/329 |
| 2009/0086685 A1* | 4/2009 | Aghili et al. | 370/336 |
| 2009/0116416 A1* | 5/2009 | Sekiya | 370/310 |
| 2010/0031110 A1* | 2/2010 | Seok et al. | 714/748 |
| 2010/0054188 A1* | 3/2010 | Matsumoto et al. | 370/328 |
| 2010/0182932 A1 | 7/2010 | Maheshwarl et al. | |
| 2010/0238910 A1* | 9/2010 | Conway et al. | 370/336 |
| 2010/0254369 A1* | 10/2010 | Tao et al. | 370/346 |
| 2010/0271970 A1 | 10/2010 | Pan et al. | |
| 2010/0323737 A1* | 12/2010 | Koo et al. | 455/509 |
| 2011/0002309 A1 | 1/2011 | Park et al. | |
| 2011/0032925 A1 | 2/2011 | Lee et al. | |
| 2011/0096710 A1* | 4/2011 | Liu et al. | 370/312 |
| 2011/0142075 A1 | 6/2011 | Che et al. | |
| 2011/0286377 A1 | 11/2011 | Sampath et al. | |
| 2012/0195250 A1* | 8/2012 | Jain et al. | 370/312 |
| 2013/0142076 A1* | 6/2013 | Ramos et al. | 370/254 |

FOREIGN PATENT DOCUMENTS

| | | |
|---|---|---|
| WO | WO-2005060198 A1 | 6/2005 |
| WO | 2009116759 A2 | 9/2009 |
| WO | WO-2010076868 A1 | 7/2010 |
| WO | WO-2010116910 A2 | 10/2010 |

OTHER PUBLICATIONS

European Search Report—EP14179080—Search Authority—The Hague—Jan. 29, 2015.

* cited by examiner

| Field Name | Size in Octets | Field Description |
|---|---|---|
| fc | 2 | frame control |
| dur | 2 | duration |
| a1 | 6 | address 1 |
| fcs | 4 | frame control sequence |
| TOTAL SIZE: | 14 | |

| Field Name | Size in Bits | Field Description |
|---|---|---|
| pv | 2 | protocol version |
| type | 2 | frame type |
| subtype | 4 | frame subtype |
| to-ds | 1 | to distribution system |
| from-ds | 1 | from distribution system |
| more frag | 1 | more fragments |
| retry | 1 | retry |
| pm | 1 | power management |
| md | 1 | more data |
| pf | 1 | protected frame |
| order | 1 | order |
| TOTAL SIZE: | 16 | |

FIG. 3

SYSTEMS AND METHODS FOR ACKNOWLEDGING COMMUNICATIONS FROM A PLURALITY OF DEVICES

CROSS REFERENCE TO RELATED APPLICATION(S)

This application claims the benefit of U.S. Provisional Application No. 61/495,256, filed Jun. 9, 2011, the entire content of which is incorporated herein by reference.

BACKGROUND

1. Field

The present application relates generally to wireless communications, and more specifically to systems, methods, and devices for acknowledging communications from a plurality of devices.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. As part of this communication process, a first device that receives information from a second device may transmit an acknowledgment (ACK) to the second device acknowledging that the first device received the information. The act of transmitting an acknowledgment adds additional overhead to communications in the wireless network.

This additional overhead may be especially problematic in some wireless networks. For example, in some areas, such as in Europe, some spectrums (e.g., wireless channels, frequency bands, etc.) have a transmit duty cycle restriction of 100 seconds per hour. In these areas, a given transmitter is only allowed to transmit in those spectrums for 100 seconds or less in a given hour. In some cases, such as for devices collecting measurements from sensors, the overhead of sending ACKs alone may exceed this duty cycle restriction. Thus, improved systems, methods, and devices for communicating ACKs are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include transmitting and/or receiving an ACK that includes information signifying whether information was received from each of a plurality of devices, thereby reducing the overhead in transmitting ACKs.

One aspect of the disclosure provides a method of communicating in a wireless network. The method includes determining whether a communication has been received from each of a plurality of apparatuses within a previous period, generating a plurality of indicators, and wirelessly broadcasting a communication comprising the plurality of indicators. In some aspects, each indicator signifies a result of the determination for a respective one of the plurality of apparatuses.

Another aspect of the disclosure provides an apparatus for communicating in a wireless network. The apparatus includes a processor configured to determine whether a communication has been received from each of a plurality of apparatuses within a previous period and further configured to generate a plurality of indicators, and a transmitter configured to wirelessly broadcast a communication comprising the plurality of indicators. In some aspects, each indicator signifies a result of the determination for a respective one of the plurality of apparatuses.

Another aspect of the disclosure provides an apparatus for communicating in a wireless network. The apparatus includes means for determining whether a communication has been received from each of a plurality of apparatuses within a previous period, means for generating a plurality of indicators, and means for wirelessly broadcasting a communication comprising the plurality of indicators. In some aspects, each indicator signifies a result of the determination for a respective one of the plurality of apparatuses.

Another aspect of the disclosure provides a computer readable medium. The computer readable medium includes instructions that when executed cause an apparatus to determine whether a communication has been received from each of a plurality of apparatuses within a previous period, generate a plurality of indicators, and wirelessly broadcast a communication comprising the plurality of indicators. In some aspects, each indicator signifies a result of the determination for a respective one of the plurality of apparatuses.

Another aspect of the disclosure provides a method of communicating in a wireless network. The method includes wirelessly transmitting a first communication to a first apparatus and wirelessly receiving a second communication from the first apparatus. In some aspects, the second communication includes a plurality of indicators signifying whether the first apparatus received a communication from each of a plurality of apparatuses. The method further includes determining whether the first communication was received by the first apparatus based on at least one indicator of the plurality of indicators.

Another aspect of the disclosure provides an apparatus for communicating in a wireless network. The apparatus includes a transmitter configured to wirelessly transmit a first communication to a first apparatus, and a receiver configured to wirelessly receive a second communication from the first apparatus. In some aspects, the second communication includes a plurality of indicators signifying whether the first apparatus received a communication from each of a plurality of apparatuses. The apparatus further includes a processor configured to determine whether the first communication was received by the first apparatus based on at least one indicator of the plurality of indicators.

Another aspect of the disclosure provides an apparatus for communicating in a wireless network. The apparatus includes means for wirelessly transmitting a first communication to a first apparatus, and means for wirelessly receiving a second communication from the first apparatus. In some aspects, the second communication includes a plurality of indicators signifying whether the first apparatus received a communication from each of a plurality of apparatuses. The apparatus further includes means for determining whether the first communication was received by the first apparatus based on at least one indicator of the plurality of indicators.

Another aspect of the disclosure provides a computer readable medium. The computer readable medium includes instructions that when executed cause an apparatus to wirelessly transmit a first communication to a first apparatus, and wirelessly receive a second communication from the first apparatus. In some aspects, the second communication includes a plurality of indicators signifying whether the first apparatus received a communication from each of a plurality of apparatuses. When executed, the instructions further cause an apparatus to determine whether the first communication was received by the first apparatus based on at least one indicator of the plurality of indicators.

BRIEF DESCRIPTION OF THE DRAWINGS

FIG. 3 illustrates an example of an acknowledgment (ACK) of a type used in certain systems for communication.

DETAILED DESCRIPTION

Figure 1:
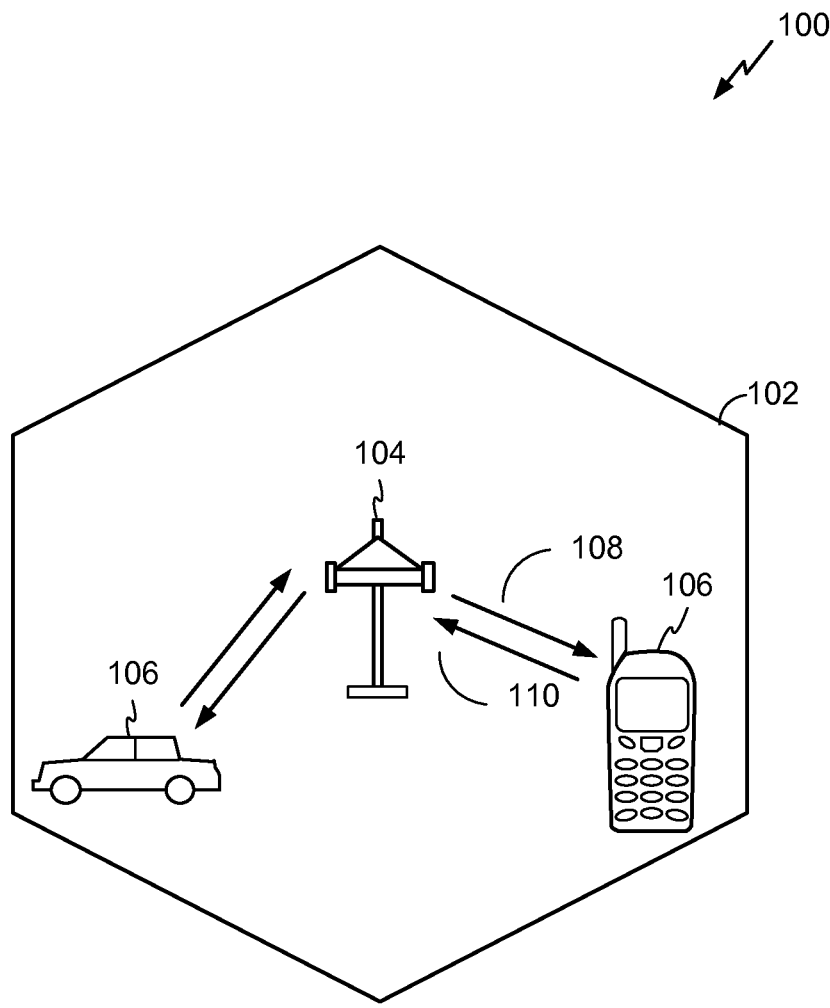
FIG. 1 illustrates an example of a wireless communication system in which aspects of the present disclosure may be employed.

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of a WiFi advanced protocol, such as the IEEE 802.11 WiFi Advanced-N protocol, or the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAB"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah or WiFi Advanced-N) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a wireless sensor device, a global positioning system device, or any other suitable device that is configured to communicate via a wireless medium.

As discussed above, certain of the devices described herein may implement the 802.11ah standard or a WiFi Advanced-N standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard or a WiFi Advanced-N standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
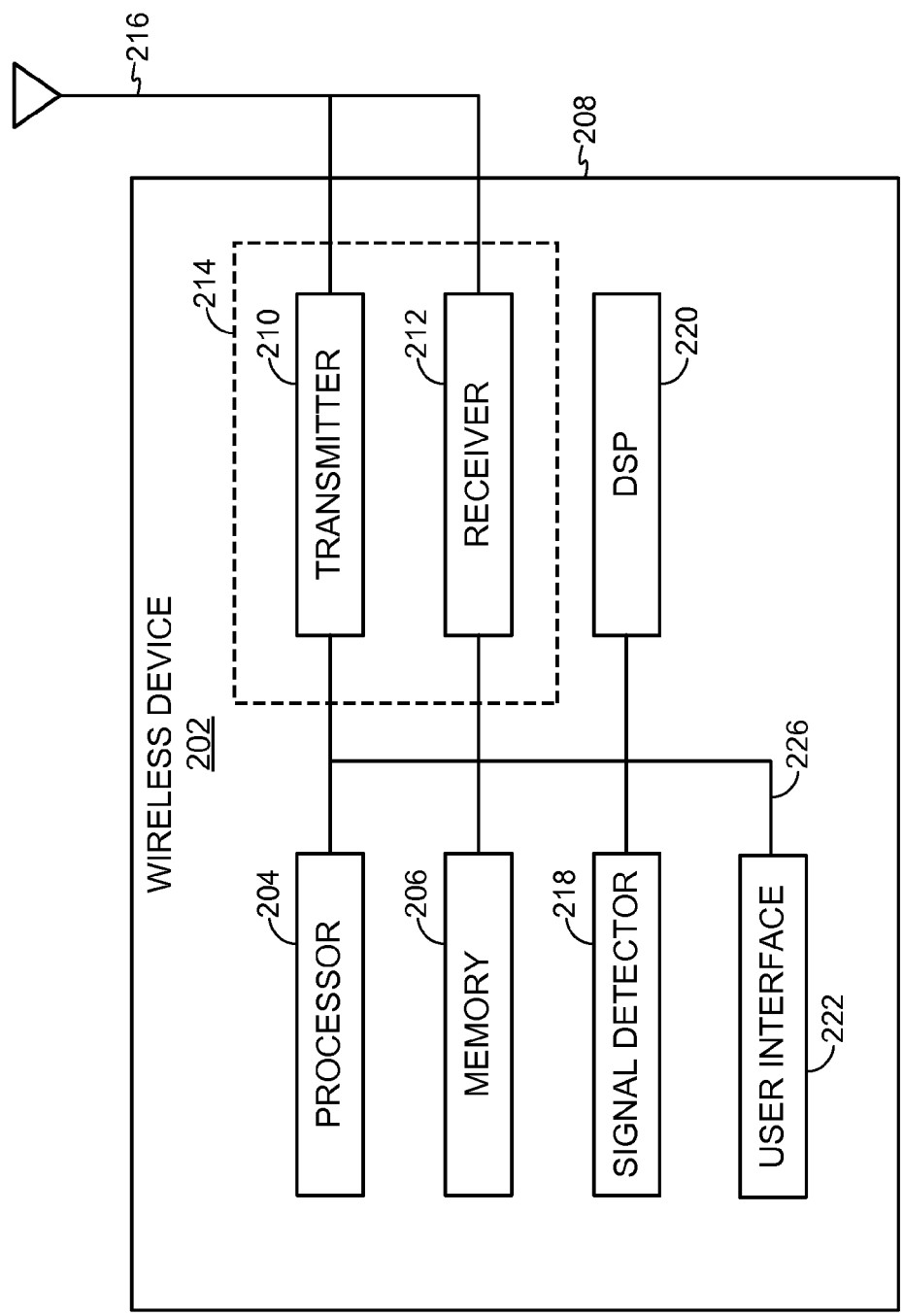
FIG. 2 illustrates various components that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

In some aspects, the processor 204 is configured to determine whether the wireless device 202 has received a communication from each of a plurality of apparatuses, for example using a receiver 212. In some aspects, the processor is further configured to generate a plurality of indicators that each signify a result of the determination for a respective one of the plurality of apparatuses. The processor 204 may include the plurality of indicators in a bitmap and/or an information element. The plurality of indicators may be included in a group ACK, described in additional detail below, that is broadcast to the plurality of apparatuses, for example using a transmitter 210.

In some aspects, the processor 204 is configured to process at least a portion of a group ACK received at the wireless device 202 using the receiver 212. If the wireless device 202 is waiting for an ACK for a previously transmitted communication, the processor 204 may determine whether the communication was properly received by a device transmitting the group ACK based on at least one of a plurality of indicators in the group ACK. Each of the plurality of indicators may signify whether the device transmitting the group ACK received a communication from a respective apparatus of a plurality of apparatuses. If the wireless device 202 is not waiting for an ACK for a previously transmitted communication, the wireless device 204 may halt reception of the group ACK or otherwise ignore the group ACK.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that includes the transmitter 210 and/or the receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

As alluded to above, the transmitter 210 may be configured to wirelessly transmit data packets and/or ACKs, for example group ACKs. Further, the receiver 212 may be configured to wirelessly receive data packets and/or ACKs, for example group ACKs.

The wireless device 202 may also include a signal detector 218 that may be used in an effort to detect and quantify the level of signals received by the transceiver 214. The signal detector 218 may detect such signals as total energy, energy per subcarrier per symbol, power spectral density, and other signals. The wireless device 202 may also include a digital signal processor (DSP) 220 for use in processing signals. The DSP 220 may be configured to generate a packet for transmission. In some aspects, the packet may comprise a physical layer convergence procedure (PLCP) protocol data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications including ACKs and other packets. For ease of reference, when the wireless device 202 is configured as a transmitting node, it is hereinafter referred to as a wireless device 202*t*. Similarly, when the wireless device 202 is configured as a receiving node, it is hereinafter referred to as a wireless device 202*r*. A device in the wireless communication system 100 may implement only functionality of a transmitting node, only functionality of a receiving node, or functionality of both a transmitting node and a receive node.

FIG. 3 illustrates an example of an ACK 300, of a type used in certain systems for communication. For example, the ACK 300 includes 4 fields: a frame control (fc) field 305, a duration/identification (dur) field 310, a receiver address (a1) field 315, and a frame control sequence (fcs) field 320. In such systems, the ACK 300 may be transmitted by a wireless device 202*r* to a wireless device 202*t* after the wireless device 202*r* receives a data packet transmitted from the wireless device 202*t*. The ACK 300 indicates to the wireless device 202*t* that it received the data packet. The wireless device 202*t* can therefore verify transmission of the data packet to the wireless device 202*r*. The wireless device 202*t* can determine that the ACK 300 is from the wireless device 202*r* based on the a1 field 315, which indicates the address of the wireless device 202*r*.

In some situations, transmitting separate ACKs to each device from which a communication has been received may be prohibitive because such transmission creates too much overhead. For example, in some areas, such as in Europe, some spectrums (e.g., wireless channels, frequency bands, etc.) have a transmit duty cycle restriction of 100 seconds per hour. In these areas, a given transmitter is only allowed to transmit in those spectrums for 100 seconds or less in a given hour. In some cases, such as for devices collecting measurements from sensors, the overhead of sending ACKs alone may exceed this duty cycle restriction. Therefore, transmission of the entire ACK 300 from the wireless device 202*r* to each wireless device 202*t* may not be feasible. For example, when the AP 104 is receiving communications from a plurality of the STAs 106, it may not be feasible for the AP 104 to send separate ACKs to each of the STAs 106.

Accordingly, systems, methods, and devices for using a single ACK which alerts a plurality of wireless devices 202*t* whether their communication was received are described herein. Such a "group ACK," as it may be referred to, may reduce the overhead of sending ACKs in the communication system 100 because separate PHY headers and padding are not needed for each individual ACK. Instead, data for acknowledging communications from a plurality of apparatuses may be included with a single PHY header. Thus, less data may be transmitted overall in the communication system 100. Less transmission of data may increase the speed with which data is transmitted, may reduce the use of bandwidth by a transmitter, and may reduce the power utilized for transmission as fewer resources are used to transmit the reduced amount of data.

Figure 4:
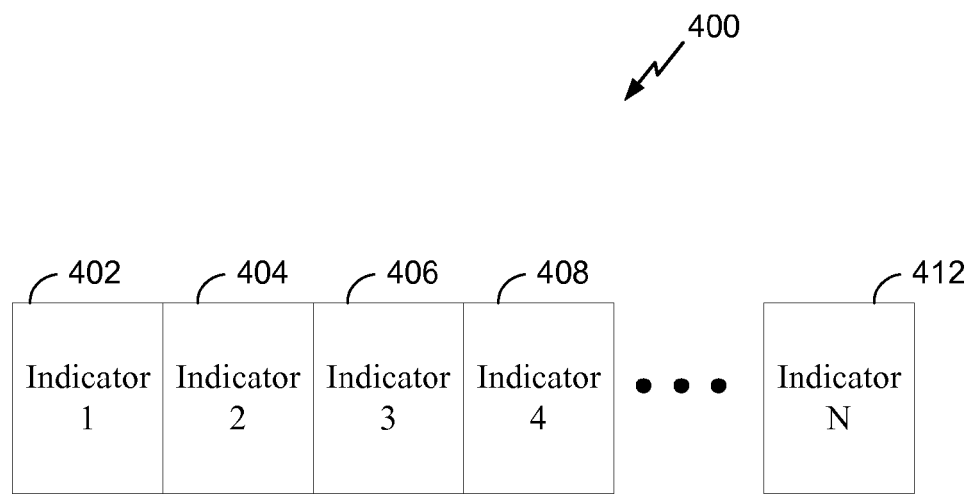
FIG. 4 illustrates an example of a plurality of indicators that may be used in a group ACK within the wireless communication system of FIG. 1.

FIG. 4 illustrates an example of a plurality 400 of indicators that may be used in a group ACK within the wireless communication system 100. Each of the plurality of indicators 402-412 indicates to a respective apparatus whether the device transmitting the plurality 400 has received a communication or other information from the apparatus. In some aspects, the plurality 400 may be included in an information element (IE) within a packet.

In some aspects, the plurality 400 is transmitted according to a schedule. For example, the plurality 400 may be periodically broadcast by the AP 104 to the STAs 106 once every 100 milliseconds. In some aspects, the plurality 400 is included in a beacon that is periodically transmitted by the AP 104 to the STAs 106. In other aspects, the plurality 400 is included in a group ACK that is separate from the beacon. In these aspects, the group ACK may be transmitted a given time period or a given number of communications after the beacon. Thus, the periodicity with which the plurality 400 is transmitted and/or received may be determined by the regularity of the beacon. In other aspects, the schedule for transmitting the group ACK is defined independent of the beacon.

The schedule of transmitting the plurality 400 may be stored in the memory 206, for example at the time of manufacturing the wireless device 202. In some aspects, the schedule is communicated to one or more of the STAs 106 by the AP 104, for example during the process of associating the STA 106 with the AP 104.

In some aspects, one or more of the indicators 402-412 includes information identifying a previous communication received from a respective apparatus. For example, a sequence number of the previous communication may be included in the indicator. In this way, an apparatus receiving the indicator may identify which of a plurality of previous communications is being acknowledged in the plurality 400. If a sequence number is not included in the indicator, the apparatus may determine that a previously transmitted communication was not received.

In other aspects, an apparatus receiving the plurality 400 may be able to determine which of the plurality of previous communications is being acknowledged based on a time at which the plurality 400 is received by the apparatus. For example, each of the plurality of indicators 402-412 may indicate to a respective apparatus whether the device transmitting the plurality 400 has received a communication or other information from the apparatus since a previous ACK was transmitted to the apparatus.

In some aspects, received communications are only acknowledged in the form of group ACKs, which may be included in the beacon or separately transmitted. In these aspects, each of the indicators 402-412 will therefore signify whether a communication or other information has been received from a respective apparatus since a previous group ACK.

In some aspects, reception of certain communications may be acknowledged by an individual ACK, for example an ACK that is addressed solely to the apparatus which transmitted the communication. For example, low-latency and/or high priority communications may be acknowledged by the AP 104 as the AP 104 receives them, as opposed to waiting until the next group ACK for acknowledgement. Thus, one or more individual ACKs may be transmitted between group ACKs in some aspects. In these aspects, the time period to which each of the indicators 402-412 pertains may differ. For example, the indicator 402 may indicate to a first apparatus whether a communication has been received from the first apparatus since a previous group ACK, while the indicator 404 may indicate to a second apparatus whether a communication has been received from the second apparatus since a previous individual ACK, where the individual ACK was transmitted after the previous group ACK. The time period covered by the second indicator 404 would therefore be shorter than the time period covered by the first indicator 402.

In some aspects, each apparatus communicating with the device that transmits the plurality 400 is assigned an association identifier (AID). For example, each of the STAs 106 communicating with the AP 104 may be assigned a unique AID. In these aspects, an apparatus receiving the plurality 400 may determine which of the indicators 402-412 to analyze based the apparatus's AID.

For example, the STAs 106 may each be assigned an AID that has a value ranging from 1 to N. One of the STAs 106 may determine whether the AP 104 properly received a communication from the one STA by indexing into the plurality 400 with the one STA's AID, and evaluating the indicator at that index. As an example, when an apparatus which as been assigned AID of 3 receives the plurality 400, the apparatus may evaluate the indicator 406 (the third indicator) to determine if a communication previously transmitted by the apparatus was received.

As another example, the STAs 106 may each be assigned an AID that has a value ranging from 1+X through N+X. To determine whether the AP 104 properly received a communication from one of the STAs 106, the one STA may evaluate the indicator positioned at index AID-X.

In some aspects, the AIDs of the apparatuses to which the plurality 400 is directed are not sequential. In these aspects, the AID may not directly correspond to an indicator index, but an order of the indicators 402-412 may still be determined based on the relative values of the AIDs. Those having ordinary skill in the art will recognize other methods that may be used to sequence, position, or arrange the indicators 402-412 based on an AID of the respective apparatus to which the each of the indicators 402-412 pertains.

In some aspects, the plurality 400 is implemented using a bitmap. In these aspects, each of the indicators 402-412 is represented by a bit. For example, a value of "0" in one of the indicators 402-412 may indicate that a communication has not been received from an apparatus, while a value of "1" in the indicator may signify that a communication has been received from the apparatus. In some aspects, these values are reversed.

When the plurality 400 is implemented using a bitmap and the indicators 402-412 are arranged according to the AIDs of the apparatuses associated with the device transmitting the plurality 400, the plurality 400 may resemble a traffic indication map (TIM). Instead of each bit in the bitmap indicating whether a frame is buffered for a respective apparatus, as in the TIM, each bit of the bitmap implementing the plurality 400 indicates whether a frame or packet has been received from a respective apparatus since a previous ACK was transmitted to the respective apparatus. In some such aspects, the array of indicators 402-412 may be referred to as an ACK TIM due to the similarity with the TIM. In some aspects, a subset of the indicators 402-412 may be included in the plurality 400, similar to the way in which a partial virtual bitmap may be included in the TIM.

In the aspect illustrated in FIG. 4, five indicators 402-412 are shown. The plurality 400 may, however, include a greater or fewer number of indicators. For example, the plurality 400 may include two indicators in some aspects. In other aspects, the plurality 400 includes three or four indicators. In some aspects, the plurality 400 includes greater than five indicators, such as 2008 indicators or more.

As discussed above, the plurality 400 may be transmitted in a group ACK by a wireless device 202r after the device receives an incoming data packet from one or more wireless devices 202t. Before sending the group ACK and after receiving the incoming data packet(s), the wireless device 202r may further decode the data packet(s) and check to see if a frame control sequence (for example a cyclic redundancy check) of the data packet(s) passes, thereby indicating that there are no errors in the reception of the data packet(s). In some aspects, an indicator signifying that the data packet(s) was correctly received is only set if the frame control sequence passes.

Figure 5:
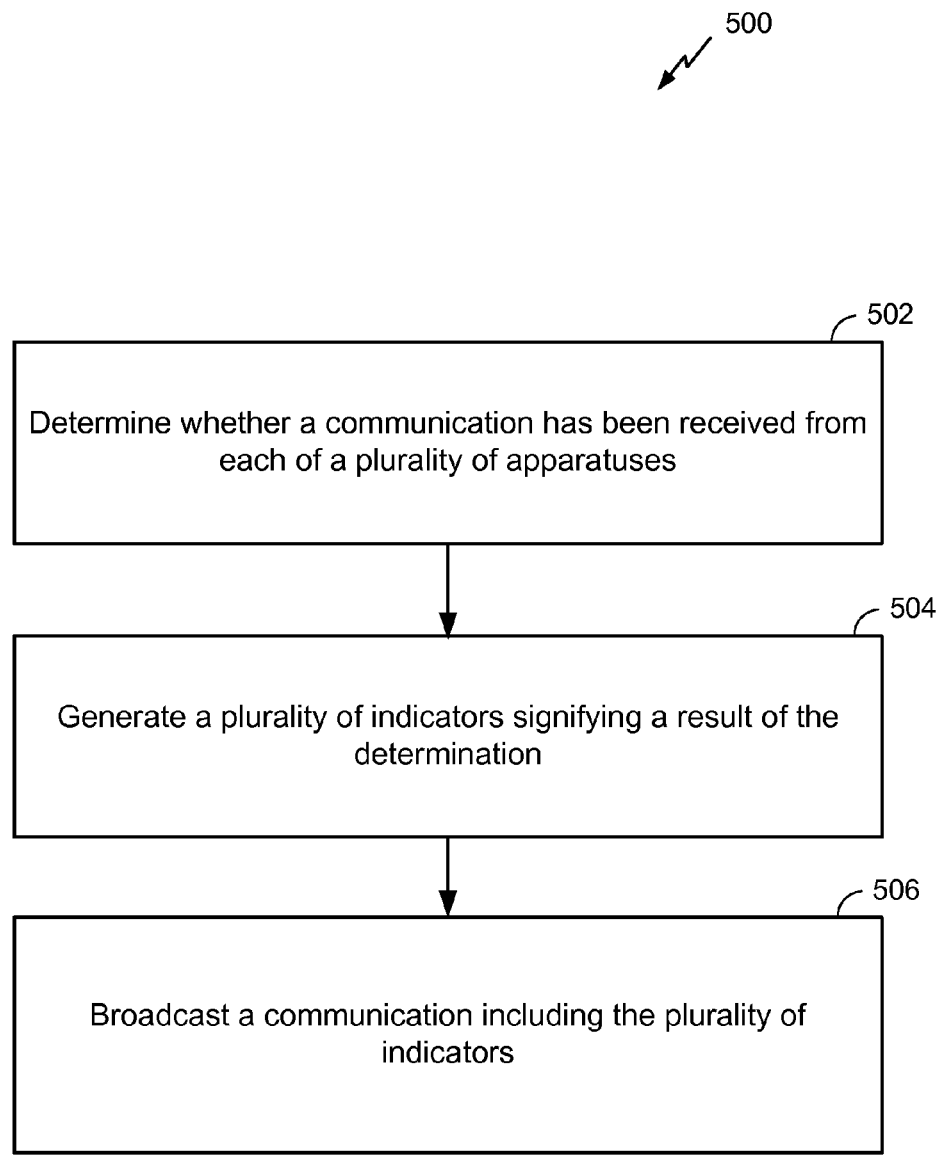
FIG. 5 illustrates an aspect of a method for transmitting a group ACK.

FIG. 5 illustrates an aspect of a method 500 for transmitting a group ACK. The method 500 may be used to transmit the plurality 400 illustrated in FIG. 4, or another suitable plurality of indicators based on the teachings herein. The plurality 400 may be generated and transmitted at the AP 104, for example, and transmitted to a plurality of the STAs 106. Although the method 500 is described below with respect to elements of the wireless device 202, those having ordinary skill in the art will appreciate that other components may be used to implement one or more of the steps described herein.

At a block 502, it is determined whether a communication has been received from each of a plurality of apparatuses. For example, the AP 104 may determine whether a packet was received from each of the STAs 106 associated with the AP 104. The reception may be performed by the receiver 212, for example. In some aspects, it may be determined whether a communication has been received within a previous period, for example a time period since a previous ACK was transmitted. The determination may be performed by the processor 204, the signal detector 218, and/or the DSP 220, for example.

At a block 504, a plurality of indicators signifying a result of the determination are generated. In some aspects, each indicator signifies a result of the determination for a respective one of the plurality of apparatuses. In some aspects, the plurality of indicators is represented by a bitmap, whereby each indicator is implemented with one bit. In these aspects, an order of the bits in the bitmap may be determined based on the AIDs of the plurality of apparatuses. The generation may be performed by the processor 204 and/or the DSP 220, for example.

At a block 506, a communication including the plurality of indicators is broadcast. The indicators may be broadcast within an information element in a beacon, for example, or as a separate group ACK including the bitmap. The transmission may be performed by the transmitter 210, for example.

Figure 6:
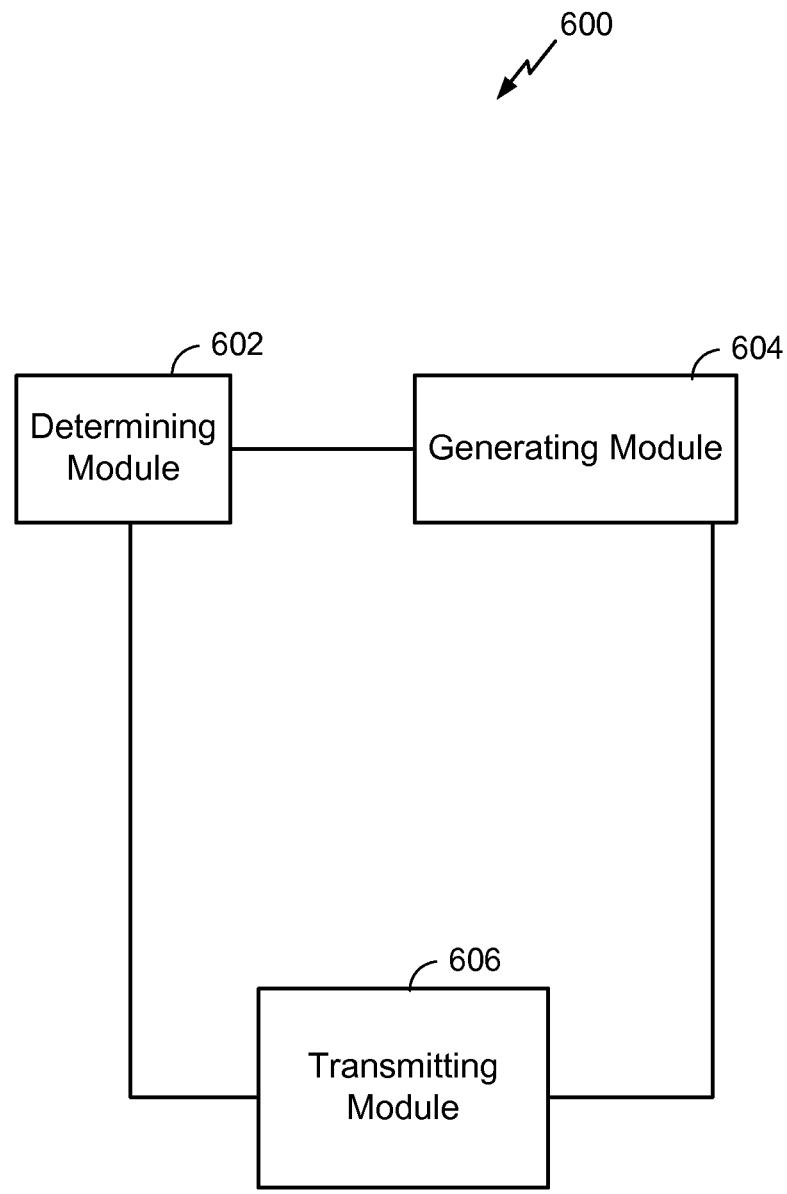
FIG. 6 is a functional block diagram of another exemplary wireless device that may be employed within the wireless communication system of FIG. 1.

FIG. 6 is a functional block diagram of another exemplary wireless device 600 that may be employed within the wireless communication system 100. The device 600 comprises a determining module 602 for determining whether a communication has been received from each of a plurality of apparatuses within a previous period. The determining module 602 may be configured to perform one or more of the functions discussed above with respect to the block 502 illustrated in FIG. 5. The determining module 602 may correspond to one or more of the processor 204, the signal detector 218, and the DSP 220. The device 600 further comprises a generating module 604 for generating a plurality of indicators. In some aspects, each indicator signifies a result of the determination for a respective one of the plurality of apparatuses. In some aspects, the indicators are included in a bitmap in which each of the bits corresponds to a respective one of the plurality of apparatuses. The generating module 604 may be configured to perform one or more of the functions discussed above with respect to the block 504 illustrated in FIG. 5. The generating module 604 may correspond to one or more of the processor 204 and the DSP 220. The device 600 further comprises a transmitting module 606 for broadcasting a communication including the plurality of indicators. The communication may comprise a group ACK, for example that is integrated into a beacon or that is transmitted separate from the beacon. The transmitting module 606 may be configured to perform one or more of the functions discussed above with respect to the block 506 illustrated in FIG. 5. The transmitting module 606 may correspond to the transmitter 210.

Figure 7A:
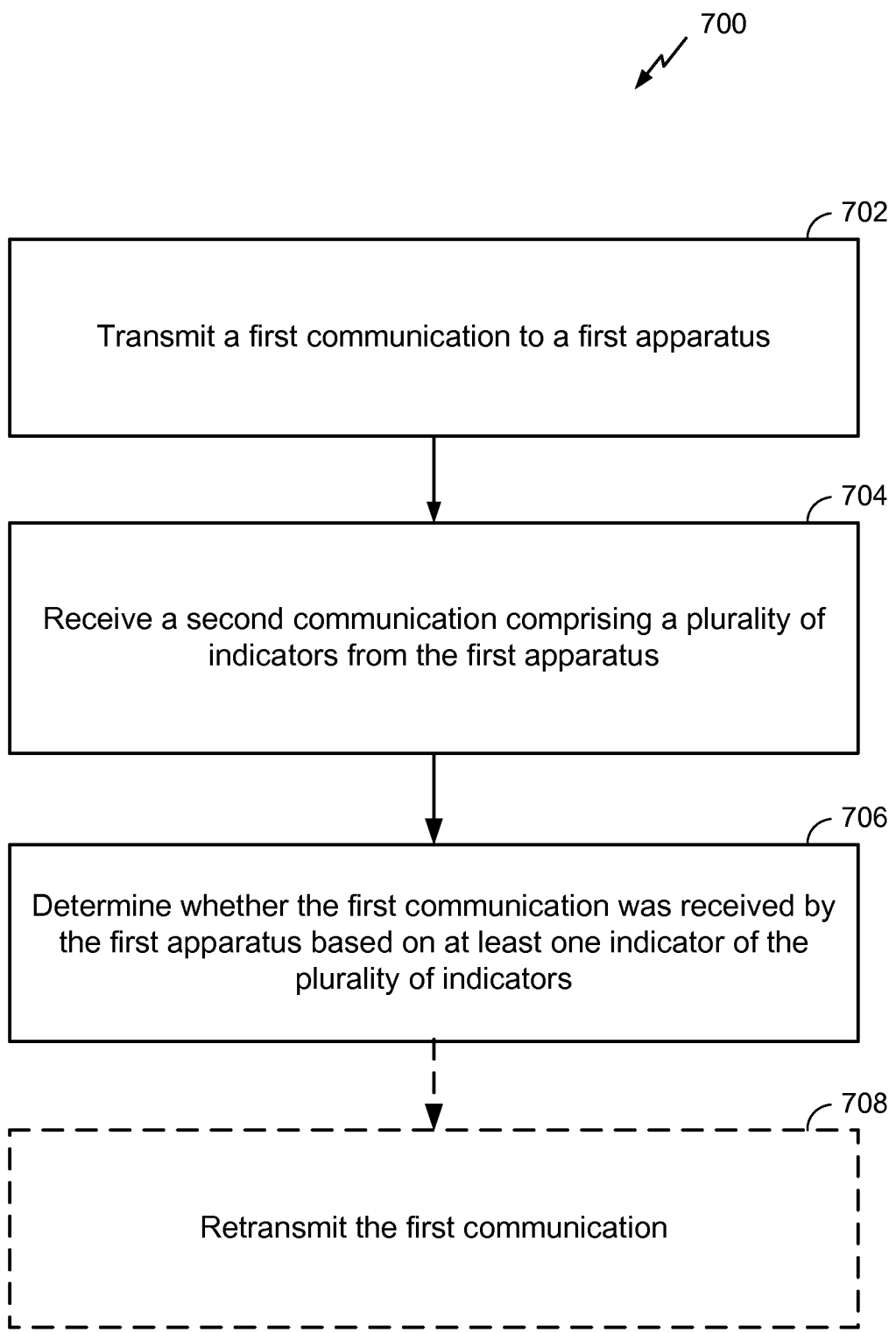
FIG. 7A illustrates an aspect of a method for receiving a group ACK.

FIG. 7A illustrates an aspect of a method 700 for receiving a group ACK. The method 700 may be used to receive the plurality 400 illustrated in FIG. 4, or another suitable plurality of indicators based on the teachings herein. The plurality 400 may be received and processed at one of the STAs 106, for example from the AP 104. Although the method 700 is described below with respect to elements of the wireless device 202, those having ordinary skill in the art will appreciate that other components may be used to implement one or more of the steps described herein.

At a block 702, a communication such as a data packet is transmitted to an apparatus, for example to the AP 104. The communication may comprise any one of a multitude of different types of frames or messages. The transmission may be performed by the transmitter 210, for example At a block 704, a communication comprising a plurality of indicators is received from the apparatus. In some aspects, each indicator signifies whether the apparatus has received a communication from a respective device of a plurality of devices. In some aspects, the plurality of indicators is represented by a bitmap, whereby each indicator is implemented with one bit. In some aspects, each of the indicators may signify whether a communication was received within a previous period, for example a time period since a previous ACK. The reception may be performed by the receiver 212, for example.

At a block 706, it is determined whether the communication transmitted at the block 702 was received by the apparatus. The determination is based on at least one of the indicators receive at the block 704. For example, an STA which transmitted the communication at the block 702 and received the plurality of indicators at the block 704 may determine if the communication was received by the AP 104 by indexing into the plurality of indicators using the AID of the STA. A value of the indicator at the index determined by the AID may signify if the communication transmitted at the block 702 was properly received. The determination may be performed by the processor 204, the signal detector 218, and/or the DSP 220, for example.

If the communication transmitted at the block 702 was not properly received, as determined at the block 706, the communication may be retransmitted at a block 708. The transmitter 210 may perform the retransmission, for example.

Figure 7B:
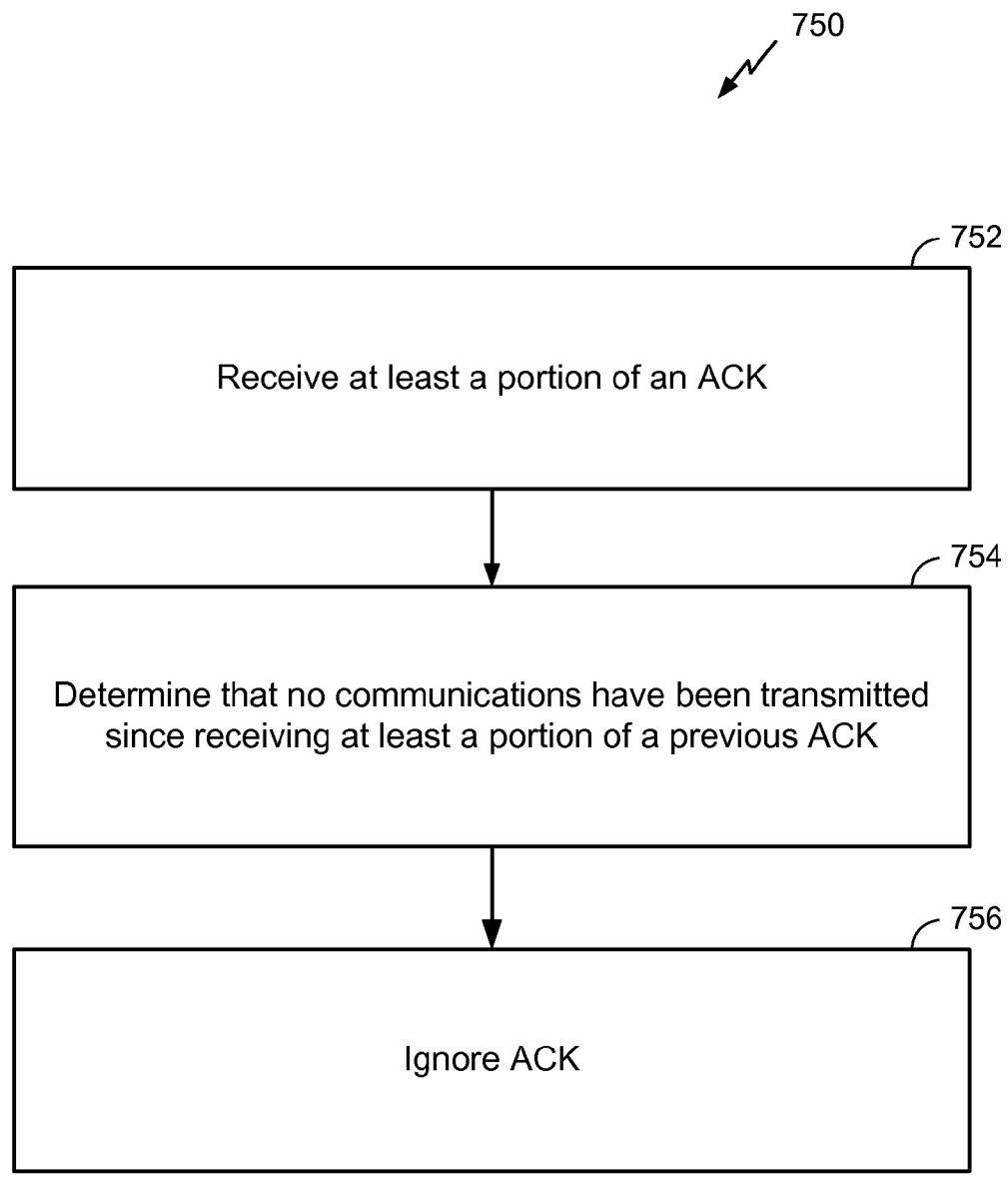
FIG. 7B illustrates another aspect of a method for receiving a group ACK.

FIG. 7B illustrates another aspect of a method 750 for receiving a group ACK. The method 750 may be used to receive at least a portion of the plurality 400 illustrated in FIG. 4, or another suitable plurality of indicators based on the teachings herein. The plurality 400 may be at least partially received and processed at one of the STAs 106, for example from the AP 104. Although the method 750 is described below with respect to elements of the wireless device 202, those having ordinary skill in the art will appreciate that other components may be used to implement one or more of the steps described herein.

At a block 752, at least a portion of a group ACK is received. For example, enough of the group ACK may be received for the wireless device 202 to determine that the information being received is a group ACK. In some aspects, the processor 204, the signal detector 218, and/or the DSP 220 may determine that the information corresponds to a group ACK based on header information, or based on contents of the plurality 400, for example. The reception may be performed by the receiver 212, for example.

At a block 754, it is determined that no communications have been sent to the device that transmitted the group ACK since a previous ACK was received at the wireless device 202. The determination may be performed by the processor 204 and/or the DSP 220, for example.

At a block 756, reception of any remaining portion of the group ACK is interrupted and the group ACK is ignored. For example, the processor 204 may cease analyzing the group ACK or be precluded from evaluating the plurality 400. Similarly, reception of the remainder of the group ACK may be stopped at the receiver 212. In this way, when the wireless device 202 is not waiting for acknowledgment of any communications, the wireless device 202 may conserve power by reserving resources that would otherwise be allocated to receiving and/or processing the group ACK.

Figure 8:
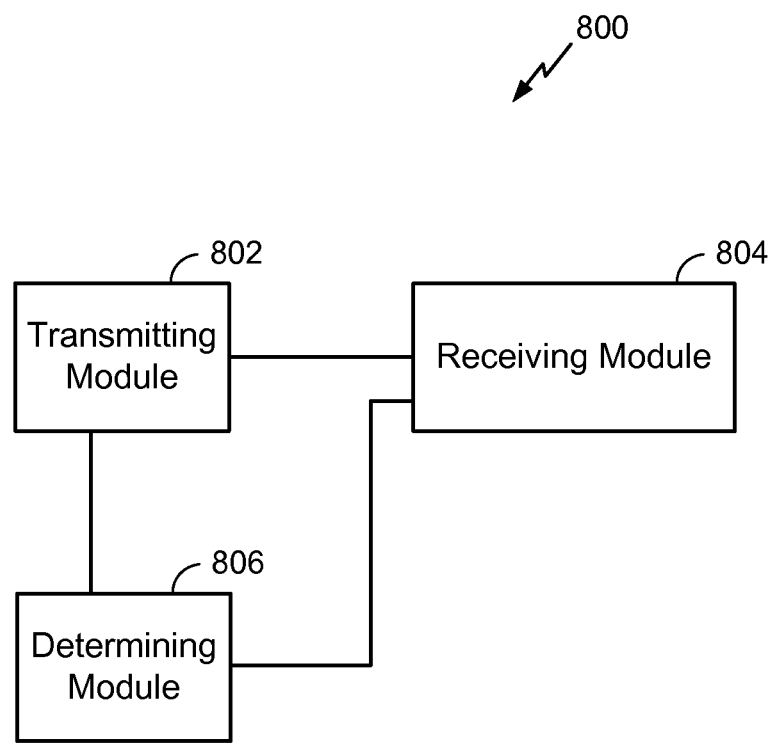
FIG. 8 is a functional block diagram of another exemplary wireless device that may be employed within the wireless communication system of FIG. 1.

FIG. 8 is a functional block diagram of another exemplary wireless device 800 that may be employed within the wireless communication system 100. The device 800 comprises a transmitting module 802 for transmitting a first communication to a first apparatus. The transmitting module 802 may be configured to perform one or more of the functions discussed above with respect to the block 702 illustrated in FIG. 7A. The transmitting module 802 may correspond to the transmitter 210, for example. The device 800 further comprises a receiving module 804 for receiving a second communication including a plurality of indicators from the first apparatus. The receiving module 804 may be configured to perform one or more of the functions discussed above with respect to the block 704 illustrated in FIG. 7A, and/or one or more of the functions discussed above with respect to the block 752 illustrated in FIG. 7B. The receiving module 804 may correspond to the receiver 212, for example. The device 800 further comprises a determining module 806 for determining whether the first communication was received by the first apparatus based on at least one indicator in the plurality of indicators. The determining module 806 may be configured to perform one or more of the functions discussed above with respect to the block 706 illustrated in FIG. 7A. In some aspects, the determining module 806 is additionally or in the alternative configured to perform one or more of the functions discussed above with respect to the block 754 and/or the block 756 illustrated in FIG. 7B. The determining module 806 may correspond to the processor 204, the signal detector 218, and/or the DSP 220, for example.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless network, the method comprising:
   determining whether a communication has been received from each of a plurality of apparatuses within a previous period;
   generating a plurality of indicators, each indicator signifying a result of the determination for a respective one of the plurality of apparatuses and including information identifying a previous communication received from the respective one of the plurality of apparatuses within the previous period, wherein the plurality of indicators includes the information identifying the previous communication received from at least two different apparatuses;
   wirelessly broadcasting a beacon associated with a periodicity with which the plurality of indicators is to be broadcast; and
   wirelessly broadcasting a communication comprising the plurality of indicators according to a stored schedule indicating the periodicity,
   wherein the generating comprises generating a bitmap comprising the plurality of indicators having information identifying the previous communication received from the respective one of the plurality of apparatuses within the previous period, each of the plurality of indicators comprising a bit in the bitmap and signifying the result of the determination for the respective one of the plurality of apparatuses, wherein at least two indicators of the plurality of indicators in the bitmap include the information identifying the previous communication received from the at least two different apparatuses, and wherein the broadcast communication includes the bitmap.

2. The method of claim 1, wherein the previous period comprises a time period since a prior communication was transmitted that indicated to one or more of the plurality of apparatuses whether information had been received from the one or more apparatuses.

3. The method of claim 2, wherein the previous period is the same for each of the plurality of apparatuses.

4. The method of claim 2, wherein the previous period for a first of the plurality of apparatuses is different than the previous period for a second of the plurality of apparatuses.

5. The method of claim 1, wherein the generating comprises generating an information element comprising the plurality of indicators, and wherein the broadcast communication includes the information element.

6. The method of claim 1, wherein a position of each of the plurality of indicators in the bitmap is determined pursuant to an association identifier of the respective one of the plurality of apparatuses.

7. The method of claim 1, wherein the communication comprises the beacon.

8. The method of claim 1, further comprising:
   communicating the stored schedule to each of the plurality of apparatuses.

9. The method of claim 1, further comprising receiving a communication from one or more of the plurality of apparatuses within the previous period.

10. An apparatus for communicating in a wireless network, the apparatus comprising:
    a processor configured to determine whether a communication has been received from each of a plurality of apparatuses within a previous period, and further configured to generate a plurality of indicators, each indicator signifying a result of the determination for a respective one of the plurality of apparatuses and including information identifying a previous communication received from the respective one of the plurality of apparatuses within the previous period, wherein the plurality of indicators includes the information identifying the previous communication received from at least two different apparatuses; and
    a transmitter configured to wirelessly broadcast a beacon associated with a periodicity with which the plurality of indicators is to be broadcast and to wirelessly broadcast a communication comprising the plurality of indicators according to a stored schedule indicating the periodicity,
    wherein the processor is configured to generate the plurality of indicators by generating a bitmap comprising the plurality of indicators having information identifying the previous communication received from the respective one of the plurality of apparatuses within the previous period, each of the plurality of indicators comprising a bit in the bitmap and signifying the result of the determination for the respective one of the plurality of apparatuses, wherein at least two indicators of the plurality of indicators in the bitmap include the information identifying the previous communication received from the at least two different apparatuses, and wherein the broadcast communication includes the bitmap.

11. The apparatus of claim 10, wherein the previous period comprises a time period since a prior communication was transmitted that indicated to one or more of the plurality of apparatuses whether information had been received from the one or more apparatuses.

12. The apparatus of claim 11, wherein the previous period is the same for each of the plurality of apparatuses.

13. The apparatus of claim 11, wherein the previous period for a first of the plurality of apparatuses is different than the previous period for a second of the plurality of apparatuses.

14. The apparatus of claim 10, wherein the processor is configured to generate the plurality of indicators by generating an information element comprising the plurality of indicators, and wherein the broadcast communication includes the information element.

15. The apparatus of claim 10, wherein a position of each of the plurality of indicators in the bitmap is determined pursuant to an association identifier of the respective one of the plurality of apparatuses.

16. The apparatus of claim 10, wherein the communication comprises the beacon.

17. The apparatus of claim 10, wherein the transmitter is further configured to transmit the stored schedule to the plurality of apparatuses.

18. The apparatus of claim 10, further comprising a receiver configured to receive a communication from one or more of the plurality of apparatuses within the previous period.

19. An apparatus for communicating in a wireless network, the apparatus comprising:
 means for determining whether a communication has been received from each of a plurality of apparatuses within a previous period;
 means for generating a plurality of indicators, each indicator signifying a result of the determination for a respective one of the plurality of apparatuses and including information identifying a previous communication received from the respective one of the plurality of apparatuses within the previous period, wherein the plurality of indicators includes the information identifying the previous communication received from at least two different apparatuses;
 means for wirelessly broadcasting a beacon associated with a periodicity with which the plurality of indicators is to be broadcast; and
 means for wirelessly broadcasting a communication comprising the plurality of indicators according to a stored schedule indicating the periodicity,
 wherein the means for generating is configured to generate a bitmap comprising the plurality of indicators having information identifying a previous communication received from the respective one of the plurality of apparatuses within the previous period, each of the plurality of indicators comprising a bit in the bitmap and signifying the result of the determination for the respective one of the plurality of apparatuses, wherein at least two indicators of the plurality of indicators in the bitmap include the information identifying the previous communication received from the at least two different apparatuses, and wherein the broadcast communication includes the bitmap.

20. A non-transitory computer readable medium comprising instructions that when executed cause an apparatus to:
 determine whether a communication has been received from each of a plurality of apparatuses within a previous period;
 generate a plurality of indicators, each indicator signifying a result of the determination for a respective one of the plurality of apparatuses and including information identifying a previous communication received from the respective one of the plurality of apparatuses within the previous period, wherein the plurality of indicators includes the information identifying the previous communication received from at least two different apparatuses;
 generate a bitmap comprising the plurality of indicators having information identifying the previous communication received from the respective one of the plurality of apparatuses within the previous period, each of the plurality of indicators comprising a bit in the bitmap and signifying the result of the determination for the respective one of the plurality of apparatuses, wherein at least two indicators of the plurality of indicators in the bitmap include the information identifying the previous communication received from the at least two different apparatuses;
 wirelessly broadcast a beacon associated with a periodicity with which the plurality of indicators is to be broadcast; and
 wirelessly broadcast a communication comprising the plurality of indicators according to a stored schedule indicating the periodicity,
 wherein the broadcast communication includes the bitmap.

21. A method of communicating in a wireless network, the method comprising:
 wirelessly transmitting a first communication to a first apparatus;
 wirelessly receiving a second communication from the first apparatus, the second communication comprising a plurality of indicators signifying whether the first apparatus received a communication from each of a plurality of apparatuses;
 determining whether the first communication was received by the first apparatus based on at least one indicator of the plurality of indicators; and
 receiving an acknowledgement from the first apparatus prior to wirelessly transmitting the first communication, wherein the first communication is transmitted from a second apparatus, and wherein the at least one indicator signifies whether the first apparatus received a communication from the second apparatus after the acknowledgement was received.

22. The method of claim 21, wherein the acknowledgement comprises a group acknowledgement.

23. The method of claim 21, wherein the acknowledgement comprises an acknowledgment addressed to only the second apparatus.

24. The method of claim 21, wherein the plurality of indicators are included in an information element.

25. The method of claim 21, wherein the plurality of indicators are included in a bitmap.

26. The method of claim 25, wherein each of the plurality of indicators comprises a bit in the bitmap.

27. The method of claim 25, wherein the first communication is transmitted from a second apparatus, wherein the method further comprises determining a position of the at least one indicator based on an association identifier of the second apparatus.

28. The method of claim 21, wherein the second communication comprises a beacon.

29. The method of claim 21, further comprising receiving a beacon, and wherein the second communication is received a scheduled time after receiving the beacon.

30. A method of communicating in a wireless network, the method comprising:
 wirelessly transmitting a first communication to a first apparatus;
 wirelessly receiving a second communication from the first apparatus, the second communication comprising a plurality of indicators signifying whether the first apparatus received a communication from each of a plurality of apparatuses;
 determining whether the first communication was received by the first apparatus based on at least one indicator of the plurality of indicators; and
 receiving at least a portion of a third communication comprising a plurality of indicators signifying whether the first apparatus received a communication from each of a plurality of apparatuses since the reception of the second communication, and ignoring the third communication.

31. An apparatus for communicating in a wireless network, the apparatus comprising:
- a transmitter configured to wirelessly transmit a first communication to a first apparatus;
- a receiver configured to wirelessly receive a second communication from the first apparatus, the second communication comprising a plurality of indicators signifying whether the first apparatus received a communication from each of a plurality of apparatuses; and
- a processor configured to determine whether the first communication was received by the first apparatus based on at least one indicator of the plurality of indicators,
- wherein the receiver is further configured to receive an acknowledgement from the first apparatus prior to the first communication being transmitted, and wherein the at least one indicator signifies whether the first apparatus received a communication from the apparatus for communicating in a wireless network after the acknowledgement was received.

32. The apparatus of claim 31, wherein the acknowledgement comprises a group acknowledgement.

33. The apparatus of claim 31, wherein the acknowledgement comprises an acknowledgment addressed to only the apparatus for communicating in a wireless network.

34. The apparatus of claim 31, wherein the plurality of indicators are included in an information element.

35. The apparatus of claim 31, wherein the plurality of indicators are included in a bitmap.

36. The apparatus of claim 35, wherein each of the plurality of indicators comprises a bit in the bitmap.

37. The apparatus of claim 35, wherein the processor is configured to determine a position of the at least one indicator based on an association identifier of the apparatus for communicating in a wireless network.

38. The apparatus of claim 31, wherein the second communication comprises a beacon.

39. The apparatus of claim 31, wherein the receiver is further configured to receive a beacon, and wherein the second communication is received a scheduled time after receiving the beacon.

40. An apparatus for communicating in a wireless network, the apparatus comprising:
- a transmitter configured to wirelessly transmit a first communication to a first apparatus;
- a receiver configured to wirelessly receive a second communication from the first apparatus, the second communication comprising a plurality of indicators signifying whether the first apparatus received a communication from each of a plurality of apparatuses; and
- a processor configured to determine whether the first communication was received by the first apparatus based on at least one indicator of the plurality of indicators,
- wherein the receiver is further configured to receive at least a portion of a third communication comprising a plurality of indicators signifying whether the first apparatus received a communication from each of a plurality of apparatuses since the reception of the second communication, and wherein the processor is further configured to ignore the third communication.

41. An apparatus for communicating in a wireless network, the apparatus comprising:
- means for wirelessly transmitting a first communication to a first apparatus;
- means for wirelessly receiving a second communication from the first apparatus, the second communication comprising a plurality of indicators signifying whether the first apparatus received a communication from each of a plurality of apparatuses;
- means for determining whether the first communication was received by the first apparatus based on at least one indicator of the plurality of indicators; and
- means for receiving an acknowledgement from the first apparatus prior to wirelessly transmitting the first communication, wherein the first communication is transmitted from a second apparatus, and wherein the at least one indicator signifies whether the first apparatus received a communication from the second apparatus after the acknowledgement was received.

42. A non-transitory computer readable medium comprising instructions that when executed cause an apparatus to:
- wirelessly transmit a first communication to a first apparatus;
- wirelessly receive a second communication from the first apparatus, the second communication comprising a plurality of indicators signifying whether the first apparatus received a communication from each of a plurality of apparatuses;
- determine whether the first communication was received by the first apparatus based on at least one indicator of the plurality of indicators; and
- receive an acknowledgement from the first apparatus prior to wirelessly transmitting the first communication, wherein the first communication is transmitted from a second apparatus, and wherein the at least one indicator signifies whether the first apparatus received a communication from the second apparatus after the acknowledgement was received.

\* \* \* \* \*